May 15, 1934.  E. W. BREMER  1,959,154
RESISTANCE WELDING ELECTRODE
Filed Dec. 14, 1933

Patented May 15, 1934

1,959,154

UNITED STATES PATENT OFFICE 1,959,154

RESISTANCE WELDING ELECTRODE

Edmund W. Bremer, Weehawken Township, Hudson County, N. J., assignor to Electroloy Company, Inc., a corporation of New Jersey Application December 14, 1933, Serial No. 702,318

8 Claims. (Cl. 219—4)

This invention relates to electrical resistance welding and more particularly to an improvement in resistance welding dies for butt and flash welding and electrodes for projection welding and splines for seam welding, of which the following is a description.

The principle involved in the art of electrical resistance welding is that of causing currents of electricity to pass through the pieces of metal which are to be welded, thereby generating heat at the point of contact, which also becomes the point of greatest resistance, while at the same time mechanical pressure is applied to force the parts together. As the current heats the metal at the junctions to the welding temperature, the pressure follows up the softening surface until a complete union or weld is effected.

Therefore, the dies and electrodes conducting the current to the pieces being welded must be made of a material which is a good electrical conductor. In addition these dies and electrodes serve to either clamp or apply the necessary pressure to the pieces being welded and must be made of a material to withstand tremendous pressures.

Heretofore, the copper dies and electrodes used for the purpose of conducting the electrical current and applying the pressure to the pieces being welded would deform very rapidly and necessitate their re-machining to their original shape. The metal alloy electrodes which have been used prior to this invention have been found somewhat useful but in many instances their costs have prohibited their use.

In accordance with the present invention, an alloy is formed of copper and beryllium in the proportions of 97.75% by weight of copper and 2.25% by weight of beryllium. The electrical conductivity after age hardening or heat treating should not be less than 40% of that of copper. The Rockwell hardness after cold working and heat treating is found to be not less than 112 on the "B" scale, using 1/16" diameter steel ball and a 100 kilogram load. Welding dies and electrodes either made entirely of this alloy or faced with this alloy are found to have a life of from 10 to 30 times that of copper.

For reference of the method of application of this alloy on dies, electrodes and splines for resistance welding, the following is a detailed description taken in connection with the accompanying drawing, in which Fig. 1 is a perspective view of a typical butt or flash welding die.

Figure 1:
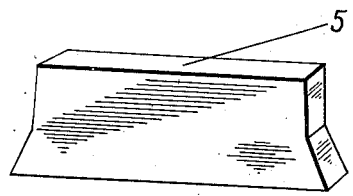

In Fig. 1, the entire butt or flash welding die is made from the present alloy and the electrical conductive surface and pressure surface is shown as 5.

Figure 2:
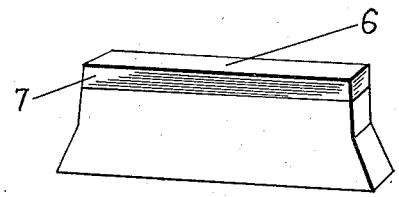
Fig. 2 is a perspective view of a typical butt or flash welding die, faced with an alloy of the present invention.

In Fig. 2, of a butt or flash welding die, the electrical conductive surface and pressure surface 6 is applied as a facing 7 made from the present alloy and attached either mechanically or brazed.

Figure 3:
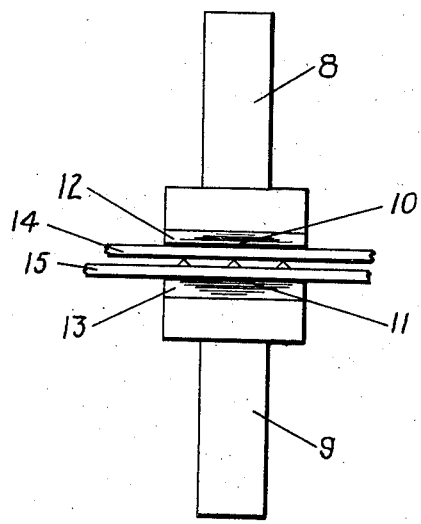
Fig. 3 is a side elevation view showing the application of the alloy as a facing material on projection welding electrodes.

In Fig. 3 is described a set of projection welding electrodes, 8 upper, 9 lower. The electrical conductive surface and pressure surface of 8 is shown as 10 and likewise of 9 is shown as 11. The upper electrode 8 is faced with the present alloy 12 and likewise of 9 is shown as 13. The sheets 14 and 15 being projection welded by applying the necessary current and pressure to 8 and 9.

Figure 4:
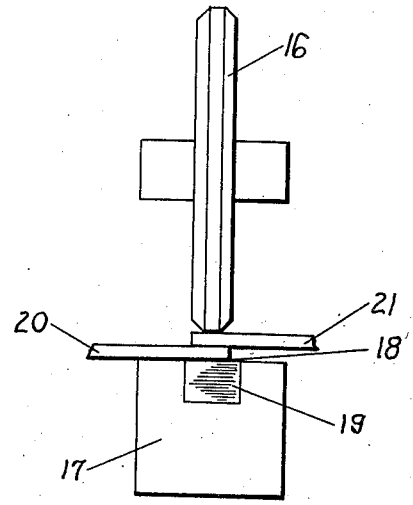
Fig. 4 is a front elevation view illustrating the application of the alloy as an insert in a spline for seam or line welding.

In Fig. 4, of an electrical seam welding application 16 describes the seam welding roll and 17 the spline. The electrical conductive surface and pressure surface of the spline 17 is shown as 18, this being inserted with the present alloy 19. The sheets 20 and 21 being seam welded by applying the necessary current and pressure to 16 and 17.

As aforementioned, the present invention of using an alloy of beryllium and copper together in the proportions of 97.75% of copper by weight and 2.25% beryllium by weight there are instances where these percentages may be varied somewhat without departing from the scope of the invention. For example, the percentages may be varied from 99% copper by weight and 1% beryllium by weight to 97% copper by weight and 3% beryllium by weight.

As the alloy of beryllium and copper has the characteristics of being a heat treatable copper alloy, it is sometimes necessary in the instances where this alloy is used as a facing for butt and flash welding dies and projection welding electrodes and as an insert for seam welding splines that the facings be attached by silver brazing to the dies and electrodes in its annealed state and thereafter heat treat the entire die or electrode to obtain the necessary hardness and conductivity.

In the instances where the entire die or electrode is made entirely of this alloy the necessary machine work is accomplished and then the entire die or electrode is heat treated.

Having described my invention, what I claim as new and desire to secure by Letters Patent is:

1. A resistance welding electrode formed from an alloy containing 97.75% copper by weight and 2.25% beryllium by weight for butt and flash welding and projection welding and splines for seam welding.

2. A resistance welding electrode formed from an alloy containing 97.75% copper by weight and 2.25% beryllium by weight cold worked and heat treated to produce a minimum Rockwell hardness of 95 on the "B" scale, using $\frac{1}{16}''$ diameter steel ball with 100 kilogram load for butt and flash welding and projection welding and splines for seam welding.

3. A resistance welding electrode formed from an alloy containing not less than 1% beryllium by weight and 99% copper by weight for butt and flash welding and projection welding, and splines for seam welding.

4. A resistance welding electrode formed from an alloy containing not more than 3% beryllium by weight and 97% copper by weight for butt and flash welding and projection welding, and splines for seam welding.

5. A resistance welding electrode facing formed from an alloy containing not less than 1% beryllium by weight and 99% copper by weight for butt and flash welding and projection welding, and splines for seam welding.

6. A resistance welding electrode facing formed from an alloy containing not more than 3% beryllium by weight and 97% copper by weight for butt and flash welding and projection welding, and splines for seam welding.

7. A resistance welding electrode formed from an alloy containing not less than 1 per cent beryllium by weight and from about 0.1 to 0.025 per cent nickel by weight and 98.9 per cent copper by weight for butt and flash welding and projection welding, and splines for seam welding.

8. A resistance welding electrode formed from an alloy containing not more than 3 per cent beryllium by weight and from about 0.1 to 0.025 per cent nickel by weight and 96.9 per cent copper by weight for butt and flash welding and projection welding, and splines for seam welding.

EDMUND W. BREMER.